(12) United States Patent
Gliner et al.

(10) Patent No.: US 11,948,267 B2
(45) Date of Patent: Apr. 2, 2024

(54) METHOD AND DEVICE FOR LOCATING A MACHINE

(71) Applicants: AIRBUS DEFENCE AND SPACE SAS, Toulouse (FR); AIRBUS (SAS), Blagnac (FR)

(72) Inventors: Loris Gliner, Toulouse (FR); Romain Lefez, Toulouse (FR); Guy Le Besnerais, Toulouse (FR)

(73) Assignees: Airbus Defence and Space SAS, Toulouse (FR); Airbus (SAS), Blagnac (FR)

( * ) Notice: Subject to any disclaimer, the term of this patent is extended or adjusted under 35 U.S.C. 154(b) by 344 days.

(21) Appl. No.: 17/324,652

(22) Filed: May 19, 2021

(65) Prior Publication Data

US 2021/0366148 A1 Nov. 25, 2021

(30) Foreign Application Priority Data

May 20, 2020 (FR) ...................................... 2005282

(51) Int. Cl.
  *G06T 3/00* (2006.01)
  *G06F 18/22* (2023.01)
  *G06T 5/00* (2006.01)
  *G06T 7/73* (2017.01)

(52) U.S. Cl.
  CPC ............ *G06T 3/0068* (2013.01); *G06F 18/22* (2023.01); *G06T 5/009* (2013.01); *G06T 7/73* (2017.01); *G06T 2207/10032* (2013.01); *G06T 2207/30184* (2013.01)

(58) Field of Classification Search
  CPC ......... G06T 7/73; G06T 3/0068; G06T 5/009; G06T 2207/30184; G06T 2207/10032; G06F 18/22
  See application file for complete search history.

(56) References Cited

U.S. PATENT DOCUMENTS 10,515,458 B1 * 12/2019 Yakimenko ............... G06T 7/74

OTHER PUBLICATIONS

Conte, Gianpaolo, and Patrick Doherty. "Vision-based unmanned aerial vehicle navigation using geo-referenced information." EURASIP Journal on Advances in Signal Processing 2009 (2009): 1-18. (Year: 2009).*
Miller, Andrew, Mubarak Shah, and Don Harper. "Landing a UAV on a runway using image registration." 2008 IEEE International Conference on Robotics and Automation. IEEE, 2008. (Year: 2008).*
Search Report for FR2005282, dated Jan. 14, 2021, 2 pages.
Martinez et al., "A Hierarchical Tracking Strategy for Vision-Based Applications On-Board UAVs", Journal of Intelligent and Robotic Systems, vol. 72, No. 3-4, Mar. 13, 2013, pp. 517-539.
(Continued)

*Primary Examiner* — Vu Le
*Assistant Examiner* — Tracy Mangialaschi
(74) *Attorney, Agent, or Firm* — Nixon & Vanderhye P.C.

(57) ABSTRACT

The device includes a database (8) storing a digital cartography (MAP) of a terrain, an acquisition unit (4) configured to acquire a digital image (IMG) of the terrain, as well as a processing unit (2) configured to receive from the acquisition unit (4) the digital image (IMG) and determine a similarity between the digital cartography (MAP) and the digital image (IMG), so as to deduce a position (POS) of said machine from a result of said similarity.

23 Claims, 3 Drawing Sheets

(56) References Cited

OTHER PUBLICATIONS

Sim et al., "Integrated Position Estimation Using Aerial Image Sequences", IEEE Transaction on Pattern Analysis and Machine Intelligence, V01. 24, No. 1, Jan. 1, 2002, pp. 1-18.

Hardie et al., Joint MAP Registration and High-Resolution Image Estimation Using a Sequence of Undersampled Images, ITTT Transactions on Image Processing, vol. 6, No. 12, Dec. 1, 1997, pp. 1621-1633.

Dame et al., "Accurate Real-Time Tracking Using Mutual Information", Mixed and Augmented Reality (ISMAR), 2000 $9^{th}$ IEEE International Symposium, Oct. 13, 2010, pp. 47-56.

Kanellakis et al., "Survey on Computer Vision for UAV's: Current Developments and Trends", Journal of Intelligent and Robotic Systems, vol. 87, No. 1, Jan. 27, 2017, pp. 141-168.

* cited by examiner

METHOD AND DEVICE FOR LOCATING A MACHINE

RELATED APPLICATION

This application claims priority to and incorporates by reference French Patent Application 2005282, filed May 20, 2020.

TECHNICAL FIELD

The present invention relates to a method and a device for locating a craft, notably an aircraft or a spacecraft. It can be a craft moving over an airport area. It can even be a craft in orbit around a celestial body, approaching a celestial body or moving over said celestial body.

BACKGROUND

Locating a craft on the surface of the Earth may be done using a Global Navigation Satellite System (GNSS) which comprises a constellation of satellites gravitating around the Earth, and a receiver embedded in the craft to be located. The receiver communicates with the satellites.

There are several GNSS navigation systems currently coexisting, including notably the European Galileo, the American GPS (Global Positioning System), the Russian GLONASS ("Global'naya Navigatsionnaya Sputnikovaya Sistema" in Russian), and the Chinese system called "Bei-Dou Navigation Satellite System".

Although these GNSS systems offer global coverage of the surface of the Earth, difficulties are sometimes encountered in their operation. One example is the cutouts in the transmission of signals between satellites and receivers on a craft. Cutouts in signals received at a craft, reduce the ability of the craft to navigation and accurately locate its position with respect to the ground. Another example is that GNSS systems can be subject to interferences which may reduce the ability of crafts to navigate and be located where the interferences are present. Interferences in receiving signals from GNSS signals may limit the ability of a craft to navigate and thus be an obstacle to certification of autonomous crafts, such as flying drones.

These shortcomings in GNSS systems create obstacles to providing crafts that can operate autonomously. As an example, these shortcomings create obstacles to autonomous taxiing of a craft on the ground, such as between a runway and a terminal at an airport. Thus, there is a need to improve the ability of craft to navigate and accurately locate the craft's position in real time to, for example, allow for autonomous operation of craft.

Moreover, in an era in which space conquest marked by an increasing number of celestial body exploration missions (such as to planets, comets, and other celestial bodies) which use spacecraft and ground rovers, the locating of a craft on a celestial bodies is a crucial issue. Thus, there is a need to provide an ability to accurately and in real time locate a spacecraft, e.g., rover, on a celestial body to enable navigation and autonomous (including semi-autonomous) movement of the spacecraft on the surface of the celestial body.

SUMMARY

The present invention may be embodied to offer a location solution that is an alternative to the satellite navigation system, and, to this end, proposes a device for locating a craft, notably an aircraft and/or a spacecraft.

A device embodying the invention may include a database comprising a mapping of a terrain, an acquisition unit configured to acquire a digital image of said terrain, and a processing unit configured to receive said digital image from said acquisition unit and determine a similarity between said digital mapping and said digital image, so as to deduce a position of said craft from a result of said similarity.

Thus, the device relies solely on existing data (mapping) and on data acquired (images) by the craft to be located. The device consequently makes it possible to dispense with instantaneous data supplied by satellite, that way making it possible to position an aircraft without involving such a technology, and opening the way to the possibility of locating a spacecraft moving in proximity to or on the surface of a celestial body.

The acquisition unit and the processing unit may be embedded on said craft.

The processing unit may be configured to at least partially download the digital mapping on the craft.

The processing unit may be configured to select a region of interest on the digital mapping. Said region of interest corresponds to a restricted area of probable location of the craft on the terrain.

The acquisition unit may comprise at least one camera configured to obtain a preliminary version of the digital image.

The acquisition unit may be configured to transform, by homography, said preliminary version into an intermediate version. This intermediate version corresponds to a projection of said preliminary version onto a plane of the digital mapping.

The acquisition unit may be configured to augment and/or or invert, by image processing, a contrast of said intermediate version to obtain a final version of the digital image.

The intermediate version and/or the final version of the digital image are intended to be used to determine said similarity.

According to one embodiment, complementing or not complementing the preceding embodiment, the processing unit is configured to augment, by image processing, a contrast of a first format of the digital mapping to obtain a final format of said mapping. Said final format is used to determine said similarity.

According to one embodiment, complementing or not complementing the preceding embodiments, the processing unit is configured to identify at least one first pixel of the digital image with at least one second pixel of the digital mapping.

Said first pixel corresponds to the sought position of the craft. Said second pixel delivers coordinates associated with said position.

According to one embodiment, complementing or not complementing the preceding embodiments, the device comprises a validation unit configured to validate a first value of said position by a comparison with a second value of said position. In particular, said second value is supplied by an inertial navigation system.

The present invention may be embodied as a method for locating a craft, notably an aircraft and/or a spacecraft. The method may use a database comprising a digital mapping of a terrain, said method comprising the following steps:

a step, called acquisition step, implemented by an acquisition unit, consisting in acquiring a digital image of the terrain, a step, called comparison step, implemented by a processing unit, consisting in determining a similarity between the digital mapping of the terrain and the digital image of said terrain, a step, called determination step, implemented by the processing unit, consisting in determining a position of said craft from a result of said comparison step.

The acquisition unit and/or the processing unit may be embedded on the craft to be located. Such a choice confers on said craft a greater autonomy for its location, and ensures better performance of the method, notably in terms of execution speed.

The comparison step may comprise a substep of at least partial downloading of the digital mapping on the craft.

Furthermore, the comparison step may comprise a substep consisting in selecting a region of interest on the digital mapping, said region of interest corresponding to a restricted area of probable location of the craft on the terrain.

The acquisition step may comprise a substep of capture of a preliminary version of the digital image using a camera of said acquisition unit.

The acquisition step also comprises a homography substep consisting in transforming the preliminary version of the digital image into an intermediate version, said intermediate version corresponding to a projection of said preliminary version onto a plane of the digital mapping.

The acquisition step may comprise an image processing substep consisting in augmenting and/or inverting a contrast of the intermediate version of the digital image to obtain a final version of said image.

The intermediate version and/or the final version of the digital image are used to determine said similarity.

According to one embodiment, complementing or not complementing other embodiments, the comparison step comprises an image processing substep consisting in augmenting a contrast of an initial format of the digital mapping to obtain a final format of said mapping. Said final format is used to determine said similarity.

According to one embodiment, complementing or not complementing the preceding embodiment, the comparison step comprises a substep of identification of at least one first pixel of the digital image with at least one second pixel of the digital mapping. Said first pixel corresponds to said position. Said second pixel delivers coordinates associated with said position.

According to one embodiment, complementing or not complementing the preceding embodiments, the method comprises a step of validation of a first value of said position by a comparison with a second value of said position, said second value being supplied by an inertial navigation system.

According to another embodiment, the invention is a method performed by an aerospace craft comprising: acquiring a digital image of terrain on which the craft is located; retrieving digital mapping from a database stored on the craft, wherein the digital mapping includes the terrain on which the craft is located; comparing the digital image of the terrain on which the craft is located to the digital mapping; based on the comparison step, determining a portion of the digital mapping similar to the digital image of the terrain on which the craft is located; identifying a location in the digital mapping for the portion of the digital image, and using the identified location in the digital mapping to determine a location of the craft.

In the method, the comparison of the digital image includes: transforming an image captured by a camera on the craft from a first plane to a second plane, wherein the first plane is an sensor plane of an imaging sensor in the camera, and the second plane corresponds a plane of said digital mapping, wherein the transformed image is the digital image compared to the digital mapping.

The method may be for an airplane, the terrain is at an airport and the digital mapping includes runways and taxiways at the airport.

The present invention also relates to a craft, in particular an aircraft or a spacecraft, which is equipped with a device as specified above.

BRIEF DESCRIPTION OF THE DRAWINGS

The attached figures will give a good understanding of how the invention can be produced. In these figures, identical references denote similar elements.

DETAILED DESCRIPTION

Figure 1:
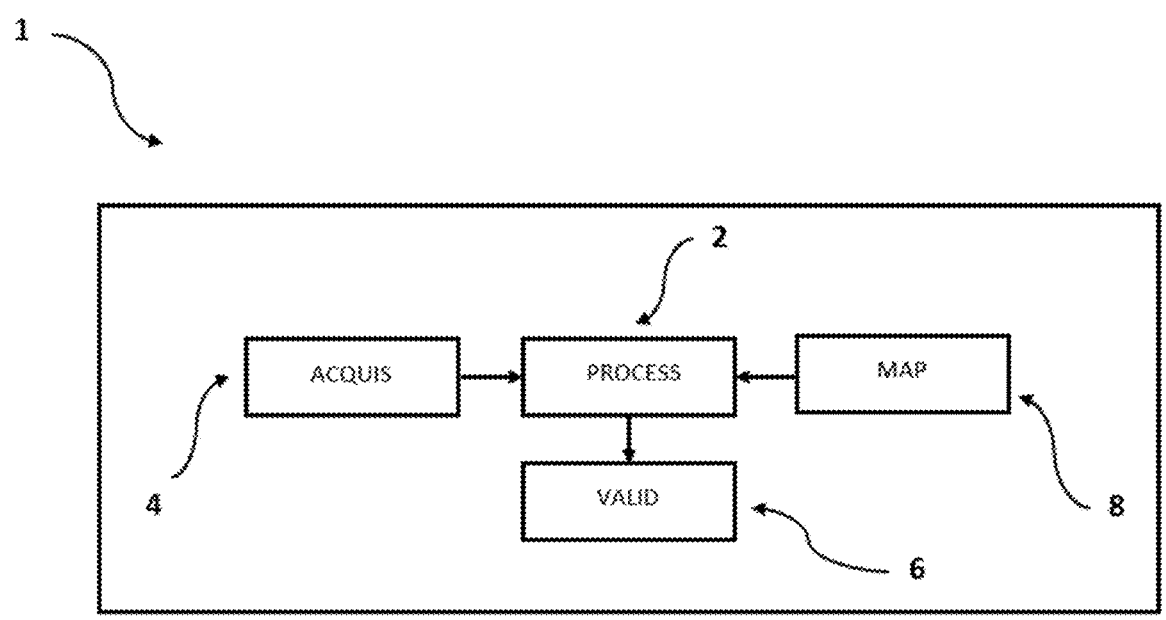
FIG. 1 is the block diagram of a particular embodiment of a device for locating a craft according to the invention.

The device 1 schematically represented in FIG. 1 is a device for locating a craft.

The device 1 comprises a database 8 incorporating a digital mapping MAP of a terrain, an acquisition unit 4 configured to acquire a digital image of said terrain, and a processing unit 2 configured to receive said digital mapping MAP from said acquisition unit 4 and determine a similarity between said digital mapping MAP and said digital image IMG. That way, the processing unit 2 makes it possible to deduce a position POS of the craft from a result of said similarity.

Terrain is understood to mean, for example, an airport area over which an aircraft is sought to be located. Over such an airport area, a first portion of ground, covered with tarmac, and a second portion of ground covered with grass, sand or earth, delimiting said first portion, can be distinguished. In particular, the first portion is intended for the taxying of aircraft and has markings on the ground separating different elements such as landing and takeoff runways, parking or maneuvering areas, traffic lanes, etc.

The term "terrain" can also designate the surface of a celestial body on which a spacecraft or a space probe is sought to be located. Such a surface comprises relief elements such as plains, hills, mountains, basins, etc.

Moreover, mapping is understood to mean a photograph, notably aerial, of an airport area, identifying different plots (runways, lanes, etc.) of said airport area. The term mapping can also refer to a terrain model (Digital Terrain Model DTM) associated with the surface of a celestial body and marking different relief elements (plains, basins, etc.) of said surface.

A terrain model these days exists for example for the Earth and for the planet Mars. The versions of photographs or terrain models used according to the invention are digital and/or digitized.

The acquisition unit 4 and/or the processing unit 2 may be embedded on the craft to be located.

The processing unit 2 may be configured to at least partially download the digital mapping MAP on the craft, in particular in said database 8.

As an example, a complete mapping of the region, area or planet relative to the trajectory to be covered by the craft is downloaded into a memory located in a server situated in the craft, said memory containing said database 8. As a variant, said mapping is downloaded in the course of the trajectory from a remote server.

When seeking to locate a craft on a terrain, a restricted region of said terrain, called region of interest ROI (Region Of Interest), in which there is a strong probability of the presence of said craft, can be known in advance and/or determined by calculation from different data. Such is the case notably for an aircraft positioned on a known portion (for example a runway, a parking area, etc.) of an airport area.

For such cases, the processing unit 2 may be configured to select a part corresponding to a region of interest ROI on the mapping MAP of the terrain. This part of the mapping MAP can then serve as the basis for comparison with the image IMG of the terrain taken by the acquisition unit 4. The use of a part of the mapping MAP rather than all of said mapping thus makes it possible to speed up the locating.

The acquisition unit 4 may comprise at least one camera. In the case of an aircraft, the invention may rely on existing cameras, notably cameras targeting a scene in front of the aircraft. However, it may be necessary to incorporate new cameras, notably cameras targeting a scene under the aircraft.

Using said camera or cameras, the acquisition unit 4 initially supplies a preliminary version PV of the image IMG of the terrain. This preliminary version PV is captured from a certain angle of view of the terrain, for example the scene in front of the aircraft, that is different from an angle of view from which the mapping MAP is produced.

In order to allow a comparison between the preliminary version PV of the image IMG and the mapping MAP, the acquisition unit 4 is configured to transform, by homography, said preliminary version PV into an intermediate version IV. This intermediate version IV corresponds to a projection of the preliminary version PV onto a plane of the mapping MAP.

The intermediate version IV thus obtained may require additional image processing in order to fully meet the needs of comparison with the mapping MAP. For that, the acquisition unit 4 is configured to augment a contrast of said intermediate version IV so as to allow a final version FV to be generated. In particular, this augmentation of contrast can be done using an image processing technique called Contrast Limited Adaptive Histogram Equalization CLAHE.

Likewise, the mapping MAP may require preliminary image processing for it to be compared with the image IMG. To this end, the processing unit 2 is configured to augment a contrast of a first format VERS1 of said mapping MAP in order to obtain a final version VERS2 of said mapping MAP. This final format VERS2 is suitable for the operation of comparison with the image IMG.

The comparison between the image IMG and the mapping MAP can be done by superimposition of said image on said mapping, and more specifically by superimposition of the pixels of said image on pixels of said mapping.

The processing unit 2 is configured to handle such a function. More specifically, the processing unit 2 makes it possible to identify a pixel of the image IMG, called first pixel, with a pixel of the mapping MAP, called second pixel. The position POS sought on the terrain TER thus corresponds to the first pixel, and the second pixel delivers coordinates (X, Y) associated with said position POS. These coordinates (X, Y) correspond to a latitude and a longitude of the craft.

According to another embodiment, the device 1 comprises a validation unit 6 configured to validate a first value of the position POS of the craft by a comparison with a second value of said position.

This second value is supplied by a third-party system, for example an inertial navigation system with which an aircraft is equipped. Said inertial navigation system will also be able to be used to determine the region of interest ROI described above.

An aircraft or a spacecraft can comprise a device 1 according to any one of the embodiments described above.

The device 1, as described above, can implement a method PR for locating a craft, notably an aircraft and/or a spacecraft.

Figure 2:
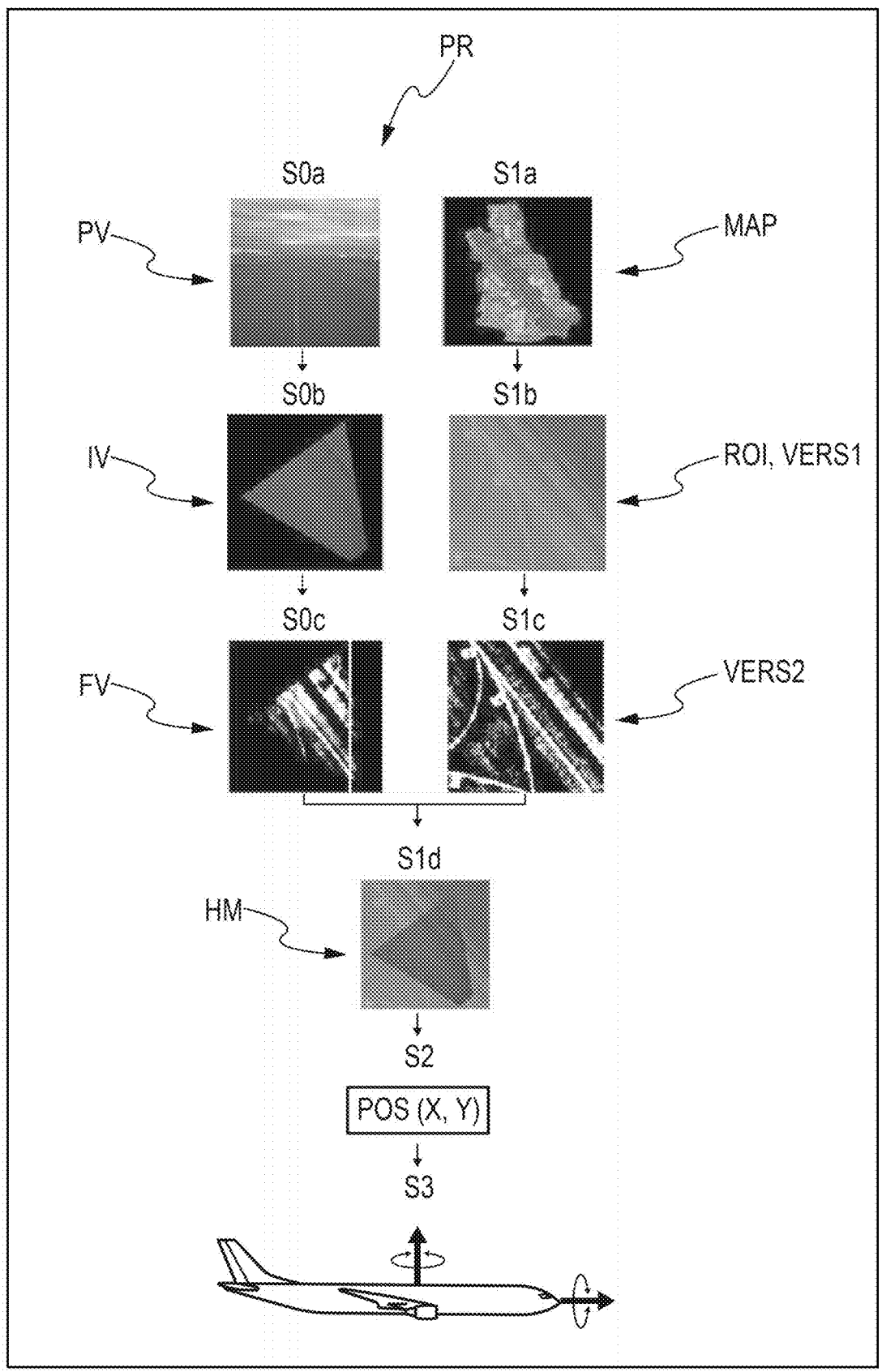
FIG. 2 schematically illustrates steps of a location method according to the invention, implemented by the device of FIG. 1.

As represented in FIG. 2, this method PR uses a mapping MAP of a terrain and comprises the following steps:
- a step S0, called acquisition step, implemented by an acquisition unit 4, consisting in acquiring a digital image IMG of the terrain,
- a step S1, called comparison step, implemented by a processing unit 2, consisting in determining a similarity between said digital mapping MAP and said digital image IMG,
- a step S2, called determination step, implemented by the processing unit 2, consisting in determining a position POS of said craft from a result of said comparison step.

In particular, the processing unit 2 and/or the acquisition unit 4 are embedded on the craft to be located, conferring on said craft a greater autonomy for its location on the terrain, and ensuring better performance of the method PR, notably in terms of execution speed.

The comparison step S1 may comprise a first substep S1a of at least partial downloading of the mapping MAP on the craft.

According to the embodiment represented in FIG. 2, this mapping MAP illustrates an aerial view of an airport area, and makes it possible to distinguish notably maneuvering areas, landing and take-off runways and buildings present on said airport area. Said mapping MAP further comprises a system of geographic coordinates associated with the airport area. It is thus possible, using this mapping MAP, to determine, for example, a latitude and/or a longitude of a given region of the airport area.

The comparison step S1 further comprise a second substep S1b consisting in selecting a region of interest ROI on said mapping MAP. Said region of interest ROI corresponds to a restricted area of probable location of said craft on said terrain.

According to the embodiment represented, the region of interest ROI is a zoom performed on the mapping MAP of the airport area, and in particular on a part of said mapping illustrating a maneuvering area of said airport area. In this zoom, it is possible to distinguish in particular markings on the ground present on the maneuvering area and an outline of a portion of ground covered with grass. Said markings and said outline are of particular form and/or color making it possible to distinguish the region of interest ROI from the rest of the airport area.

Finally, the comparison step S1 comprises a third, image processing substep S1c, consisting in augmenting a contrast of an initial format VERS1 of said mapping MAP to obtain a final format VERS2. It is this final format VERS2 which forms the base for comparison with the image IMG.

According to the embodiment represented, the final format VERS2 of the mapping MAP of the airport area reveals the markings on the ground and makes it possible to better distinguish the maneuvering area covered with tarmac from the portion covered with grass.

The comparison between the image IMG and the mapping MAP of the terrain can be done by identification of at least one first pixel of said image IMG with at least one second pixel of said mapping MAP. Such identification can be implemented in a fourth substep S1d of superimposition of said image IMG on said mapping MAP generating, for example, a heat map HM.

On the basis of such a heat map HM correlating the pixels of the image IMG and the pixels of the mapping MAP, the determination step S2 associates the sought position POS of the craft with the first pixel of the image IMG. The second pixel then supplies coordinates (X, Y) corresponding to said position POS.

The acquisition step S0 may comprise a first substep S0a of capture of a preliminary version PV of the image IMG using a camera incorporated in the acquisition unit 4.

According to the embodiment represented, the preliminary version PV of the image IMG illustrates a scene taken from a cockpit of an aircraft, and notably a part of the airport area situated in front of said aircraft. In this preliminary version PV, a portion of ground can be seen that is covered with tarmac and that comprises markings on the ground, in particular a rectilinear line and a curvilinear line. Also to be seen is a portion of ground covered with grass and adjacent to the portion covered with tarmac.

Furthermore, the acquisition step S0 comprises a second substep S0b of homography consisting in transforming said preliminary version PV into an intermediate version IV corresponding to a projection of said preliminary version PV on a plane of the mapping MAP.

According to the embodiment represented, the intermediate version IV corresponds to a scene which would be captured by a camera positioned vertically in line with the aircraft. Such a camera would thus make it possible to view the airport area according to a viewing angle of the mapping MAP of said airport area. Moreover, this intermediate version IV is processed in order to eliminate background elements on the scene represented in the preliminary version PV.

Finally, the acquisition step S0 comprises a third image processing substep S0c consisting in augmenting a contrast of said intermediate version IV to obtain a final version FV of said image IMG. In the case of an image IMG taken by a thermal camera, this third substep S0c can comprise an operation of conversion of the contrast of the intermediate version IV in order to render the latter compatible with the mapping MAP.

It should be noted that the conversion operation can constitute a substep that is entirely separate from the acquisition step S0.

According to the embodiment represented, the final version FV of the image IMG reveals the markings on the ground and makes it possible to better distinguish the region covered with tarmac and the region covered with grass.

It can be seen that the digital representations of the ground obtained, on the one hand, by the substeps S1a-S1c of processing of the mapping MAP, and, on the other hand, by the substeps S0a-S0b of processing of the image IMG, are of similar appearance. In particular, on the mapping MAP as processed by the substeps S1a-S1c, and on the image IMG as processed by the substeps S0a-S0b, markings on the ground and outlines having the same configuration can be observed. These similarities will allow an effective comparison between said image IMG and said mapping MAP.

It should be noted that the operation of augmentation of the contrast of the initial format VERS1 of the mapping MAP can be implemented by the acquisition unit 4. In this case, this operation is considered as a substep of the acquisition step S0.

In another embodiment of the invention, the method PR further comprises a validation step S3, implemented by a validation unit 6, consisting in validating a first value of the position POS of the craft by a comparison with a second value of said position. In particular, the second value of the position POS is supplied by a third-party system, for example an inertial navigation system with which an aircraft is equipped.

The method may be used to locate a moving craft. The steps S1, S2, S3 described above are then sequenced iteratively for each new position of the craft.

Figure 3A:
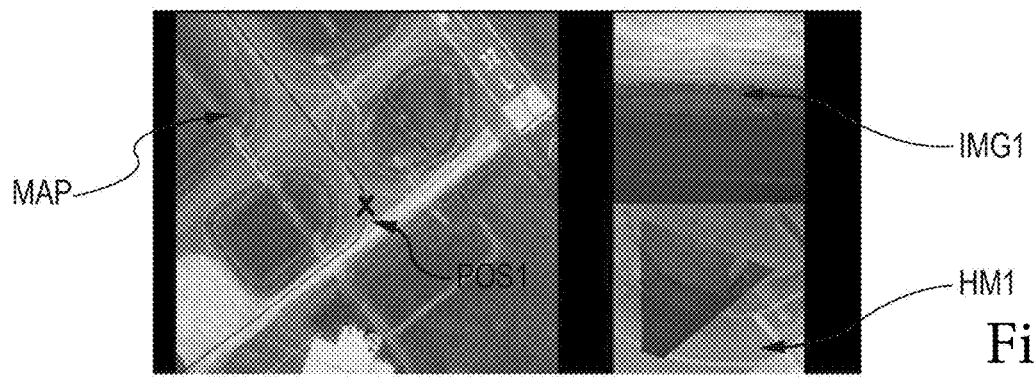
FIGS. 3(a) and 3(b) illustrate two successive positions of a craft to be located according to the method of FIG. 2.
Figure 3B:
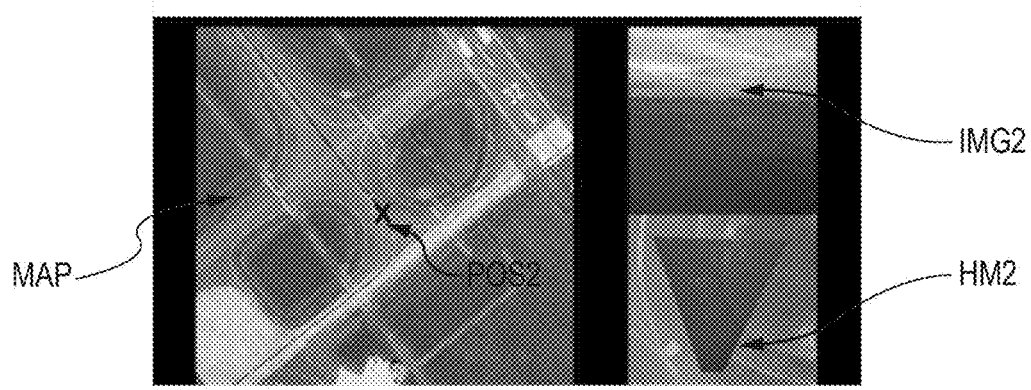

FIGS. 3(a) and 3(b) illustrate this iterative process with two successive positions POS1, POS2 of an aircraft to be sought on an airport area. In this figures, the aircraft is represented by a cross. The search for the position POS1 gives rise to a first image IMG1 and a first heat map HM1 (FIG. 3a). The search for the position POS2 leads the method PR to generate a second image IMG2 and a second heat map HM2 (FIG. 3b).

It can be seen that each image IMG1, IMG2 has singular elements that are located at different points of the mapping MAP. These singular elements are, for example, a specific curvature of a marking on the ground, or a curvature of a line of demarcation between a portion covered with tarmac and a portion covered with grass, or even a specific configuration of a tarmac portion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A device for locating a craft, notably an aircraft and/or a spacecraft comprising:
    a database including a digital mapping of a terrain,
    an acquisition unit configured to acquire a preliminary version of a digital image of said terrain, and
    a processing unit configured to:
        receive the preliminary version of the digital image from said acquisition unit;
        transform the preliminary version of the digital image into an intermediate version of said digital image, wherein said intermediate version corresponds to a projection of said preliminary version onto a plane corresponding to a plane of said digital mapping;
        augment and/or invert a contrast of said intermediate version of the digital image to obtain a final version of the digital image, wherein a contrast of the final version of the digital image is increased as compared to the contrast of the intermediate version of the digital image, retrieve a first format of a digital map from the database, augment a contrast of the first format of the digital map to form a final format of the digital map, wherein a contrast of the final format is increased as compared to a contrast of the first format of the digital map, determine a similarity between the final format of the digital map and the final version of the digital image, and determine a position of said craft based on the similarity of the final format of the digital map and the final version of the digital image.

2. The device as claimed in claim 1, wherein the processing unit and/or the acquisition unit are mounted to the craft.

3. The device as in claim 1, wherein the transform of the preliminary version includes transforming, by homography, the preliminary version of said digital image taken by a camera of said acquisition unit into the intermediate version.

4. The device as in claim 1, wherein the determine the similarity includes matching at least one first pixel of the final version of the digital image with at least one second pixel of the final version of the digital map, wherein the first pixel corresponds to the craft, and the determine the position, includes determining coordinates of the position based on a position of the second pixel in the digital image of the terrain.

5. The device as in claim 1, further comprising a validation unit configured to validate a first value of said position by a comparison with a second value of said position supplied by an inertial navigation system.

6. The device of claim 1, wherein the processing unit is configured to do the inversion of the contrast of the intermediate version of the digital image to obtain the final version of the digital image.

7. The device of claim 1, wherein the processor is configured to perform the augment of the contrast of the first format of the digital map to obtain a final format of the digital map using a Contrast Limited Adaptive Histogram Equalization image processing technique.

8. The device of claim 1, wherein the acquisition unit includes a thermal camera configured to acquire the preliminary version of the digital image of said terrain as a thermal image of said terrain.

9. A method for locating a craft comprising:

acquire a preliminary version of a digital image of a terrain transform the preliminary version of the digital image into an intermediate version of the digital image by projecting the preliminary version onto a plane corresponding to a plane of a digital map of the terrain, wherein the digital map is stored in the craft, augment and/or invert a contrast of the intermediate version of the digital image to obtain a final version of the digital image, wherein the contrast of the final version is increased as compared to a contrast of the intermediate version of the digital image, retrieve from a database stored on the craft a first format of a digital map;

augment a contrast of the first format of the digital map to obtain a final version of the digital map, wherein the contrast of the final version of the digital map is increased as compared to a contrast of the first format of the digital map, compare the final version of the digital image of the terrain to the final version of the digital map to determine a similarity between the final version of the digital image to the final version of the digital map, and determine a position of the craft in the terrain based on the similarity.

10. The method as in claim 9, wherein the steps of acquiring, transforming, augmenting, comparing and determining are performed by the craft.

11. The method as claimed in claim 9, wherein the compare further comprises:

matching at least one first pixel of said final version of the digital image with at least one second pixel of said final version of the digital map, wherein said first pixel corresponds to said position, and determining coordinates of said second pixel in the terrain to determine the position of the craft.

12. The method as in claim 9, further comprising a step of validation of a first value of said position by a comparison with a second value of said position, said second value being supplied by an inertial navigation system.

13. The method of claim 9, wherein the augment and/or the invert of the contrast of the intermediate version of the digital image includes inverting the contrast of the intermediate version of the digital image to form the final version of the digital image.

14. The method of claim 9, wherein the augment and/or the invert of the contrast of the intermediate version of the digital image includes applying to the intermediate version a Contrast Limited Adaptive Histogram Equalization image processing technique to augment the contrast.

15. The method of claim 9, wherein the step to acquire a preliminary version includes acquiring a thermal image of said terrain as the preliminary version of the digital image.

16. A method performed by an aerospace craft comprising:

acquire a preliminary version of digital image of terrain on which the craft is located;

transform the preliminary version of the digital image to an intermediate version of the digital image by projecting the preliminary version onto a plane corresponding to a plane of digital maps stored in the aerospace craft, select a first format digital map from the digital maps, wherein the selected first format digital map shows the terrain on which the craft is located;

augment and/or invert a contrast of the intermediate version of the digital image to obtain a final version of the digital image, wherein a contrast of the final version is increased as compared to the contrast of the intermediate version of the digital image, augment a contrast of the selected first format digital map to obtain a final version of the digital map, wherein the contrast of the final version of the digital map is increased as compared to a contrast of the selected first format of the digital map, compare the final version of the digital image to the final version of the digital map, based on the compare, identify a region of the final version of the digital map similar to a region of the terrain on which the craft is located as shown in the final version of the digital image;

identify a location corresponding to the region in the final version of the digital map, and using the identified location to determine an actual location of the craft.

17. The method of claim 16, wherein the transformation of the preliminary version of the digital image includes:

captured by a camera on the craft an image which is used as the preliminary version of the digital image, wherein the image captured by the camera in in a first plane corresponding to a sensor plane of an imaging sensor in the camera; and the transform includes projection the preliminary version of the digital image in the first plane to a second plane, wherein the second plane corresponds the plane of said digital maps.

18. The method of claim 16, wherein the aerospace craft is an airplane, and the terrain is at an airport and the digital mapping includes runways and taxiways at the airport.

19. The method of claim 16, further comprising:

autonomously determining a path from the actual location to a second location using the digital mapping, and autonomously moving the craft along the path to the second location.

20. The method of claim 16, wherein:

the steps of comparing and identifying include matching at least one first pixel of the final version of the digital image with at least one second pixel of the final version of the digital map, wherein said first pixel indicates a position of the craft in the final version of the digital image, and the step using the identified location includes determining coordinates of said second pixel in the terrain to determine the position of the craft.

21. The method of claim 16, wherein the s the augment and/or the invert of the contrast of the intermediate version of the digital image includes inverting the contrast of the intermediate version of the digital image to form the final version of the digital image.

22. The method of claim 16, wherein the s the augment and/or the invert of the contrast of the intermediate version of the digital image includes applying a Contrast Limited Adaptive Histogram Equalization image processing technique to augment the intermediate image.

23. The method of claim 16, wherein the step to acquire a preliminary version includes acquiring a thermal image of said terrain as the preliminary version of the digital image.

* * * * *